United States Patent [19]
Dellivenneri et al.

[11] Patent Number: 5,819,655
[45] Date of Patent: Oct. 13, 1998

[54] CYCLINDER COLOR PRINTING METHOD AND PRODUCT USING IMPROVED MISREGISTRATION DETECTION

[75] Inventors: Nicola Dellivenneri, Darien; Joseph J. Pereira, West Redding; Kimberly A. Slavin, Norwalk, all of Conn.

[73] Assignee: Bristol-Myers Squibb Company, New York, N.Y.

[21] Appl. No.: 915,408

[22] Filed: Aug. 20, 1997

[51] Int. Cl.⁶ .................................................. B41F 5/16
[52] U.S. Cl. .......................... 101/211; 101/181; 364/526; 356/402; 382/167; 395/131
[58] Field of Search ......................... 101/211, 181, 101/183; 395/131, 135; 364/526; 356/402; 382/167; 399/40

[56] References Cited

U.S. PATENT DOCUMENTS

| | | | |
|---|---|---|---|
| 4,450,766 | 5/1984 | Inomata et al. | 101/211 |
| 4,534,288 | 8/1985 | Brovman | 101/211 |
| 4,667,596 | 5/1987 | Dutzel et al. | 101/211 |
| 4,717,954 | 1/1988 | Fujita et al. | 356/402 |
| 4,852,485 | 8/1989 | Brunner | 101/211 |
| 4,975,862 | 12/1990 | Keller | 364/526 |
| 5,056,430 | 10/1991 | Bayerlein et al. | 101/211 |
| 5,063,528 | 11/1991 | Miwa et al. | 364/526 |
| 5,068,810 | 11/1991 | Ott | 364/526 |
| 5,181,257 | 1/1993 | Steiner et al. | 101/211 |
| 5,212,546 | 5/1993 | Arazi et al. | 101/211 |
| 5,546,700 | 8/1996 | Kishner et al. | 101/211 |
| 5,715,498 | 2/1998 | Takeuchi et al. | 399/40 |
| 5,729,674 | 3/1998 | Rosewarne et al. | 395/135 |

*Primary Examiner*—Eugene H. Eickholt
*Attorney, Agent, or Firm*—Morton S. Simon

[57] ABSTRACT

A method of printing multi-color images on pressure sensitive labels carried on a web uses a disk shaped mark for each color which is printed to form the image. The disks (spots) are printed on the image, or elsewhere on the top layer of the web, with one disk being printed on top of the other, so that the marks coincide in size, shape and position. If a color is misregistered, it appears as a crescent which extends beyond the multi-colored disk. Such misregistration may be immediately viewed on a video magnifier, using at least 400X magnification, and the misregistration corrected.

39 Claims, 5 Drawing Sheets

SHADE #02

FIG.1

SHADE #06

FIG.2

SHADE #10

CYCLINDER COLOR PRINTING METHOD AND PRODUCT USING IMPROVED MISREGISTRATION DETECTION

FIELD OF THE INVENTION

The present invention relates to the field of color printing and more particularly to the printing of labels for hair dye products using cylinder (roll) rotogravure printing.

BACKGROUND OF THE INVENTION

There is a need for accurate registration of images in color printing using the cylinder (roll) rotogravure process. For example, consumer products are quite often provided to customers packaged in a paperboard (cardboard) carton or a container made of some other flexible or rigid material. The package may have a picture illustrating the product, the use of the product, or some other image intended to promote the sale of the product. In particular, many cosmetic products, such as hair dye kits (hair color kits) and hair shampoo, are packaged in paperboard (cardboard) cartons and other containers. The cartons are often printed with a color picture depicting a model having the color of hair which the hair dye is designed to produce. Such cartons are printed using a sheet-fed printing process which may be expensive, and may pose inventory problems.

It is commercially important that the picture of the model be both pleasing and accurate. Some of the most common problems in achieving a pleasing and accurate picture are the following:

The skin tones of the model are not natural, but instead are off-color, as compared to the lifelike image utilized as a reference ("matchprint"), i.e., the skin tones are too red or uneven.

The hair color is not an accurate representation of the color which is sought to be produced by the hair dye kit.

There is a lack of consistency in the pictures, so that a picture on a carton from one printing run, when displayed on a store shelf next to a carton from the same or a different printing run, will not match in appearance.

Poor image quality quite understandably reflects negatively on the consumer's purchasing decision, especially in the hair color field where the consumer should see an accurate rendition of the color sought to be obtained by treatment of the hair.

In order to obtain an acceptable printed image on hair color kit cartons, it has been necessary to print using a sheet printing process and to print on the highest quality of bleached white paperboard called "SBS" (Solid Bleached Sulphate) paperboard. SBS paperboard, however, is generally expensive compared to lower grades of paperboard, such as paperboard using reprocessed paper, for example, "clay coated news". In addition, in some countries SBS paperboard is not available and a lower quality paperboard must be used, resulting in a lower quality image.

The SBS paperboard used in the prior art manufacture of cosmetic cartons, especially hair color kit cartons, that require high quality images,is provided to the printer in the form of sheets (e.g., 3 ft. by 6 ft. and 20 pound paperboard). They are printed using a sheet-fed process. A large quantity (500 to 2000 sheets) of such SBS paperboard sheets are loaded in a magazine upstream of the printer and are fed individually into the printer, which comprises rollers for conveying the sheet and printing cylinders for depositing the process inks and the line inks. The high quality of the printed image, required for these cosmetic products cartons, limits significantly the printing speed for the SBS sheets (typically from about 30 to about 50 sheets per minute). The SBS paperboard must be fed into the printer in a certain orientation, due to grain direction of the paperboard, and, after being printed, is die-cut to form the carton blank. This may limit the designer's ability to maximize the use of the sheet for the carton and thereby minimize the waste areas between cartons.

The printed carton blanks are shipped flat to various plants, worldwide, and held in inventory. When needed, the flat carton blanks are folded into cartons, and the product is placed inside. There may be over 40 shades of hair dye in one product line. A manufacturer may have over 10 product lines and thus may have to manufacture and inventory over 400 different carton types, i.e., over 400 different pictures and texts. Consequently, over 400 different carton types must be kept in inventory and shipped to numerous plants, many of which may be in foreign countries. It is quite costly to manufacture, ship and maintain a complete inventory of hundreds of different carton types in a worldwide distribution network. In addition, the cartons may, over time, absorb moisture and become unusable.

It is very expensive to print "short runs", i.e., of 10,000 to 100,000 cartons. But since there are so many carton types, many short runs are required to be printed. Consequently, the cost of SBS paperboard cartons may be a significant portion of the manufacturing cost of a product.

Printed labels are often used for packaging on which it may be difficult or costly to print directly on the package. For example, beer, wine and other glass bottles use printed labels, which are adhered to the bottles, as it is difficult to print in color on glass. Printed adhesive labels are also used on paperboard cartons, plastic bottles and other containers. However, in these cases the quality of the printed image is not critical, i.e., there is no attempt to obtain an accurate reproduction of a hair tone which is uniform from one printing batch to the next or within batches.

Labels are currently, and generally, of various types. One label type is a sheet of paper which is printed on one face. An adhesive may be applied to the unprinted face of the label in a label-applying machine just before the label is pressed against a container. Another label type uses a single layer web, without a supporting web, that is printed to form a plurality of images (labels). The labels are cut from the web in a separate operation and applied to the container by adhesive. Another type of label system, called "pressure sensitive labels", consists of a bottom supporting web (release liner), generally of a low grade of paper stock, plastic film or hybrid material, and the label itself, which may be of a high grade of paper stock. The label is part of a top layer of the web. The label is printed on one face (front face) and has a pressure sensitive adhesive (permanent or removable) on its opposite face (back face). The pressure sensitive adhesive retains the label on the supporting web and a release coating on the supporting web permits the label to be removed. The label is removed from the supporting web, generally by machine, and then pressed on the product or container, generally by the same machine.

The term, as used herein, of "pressure sensitive label" refers to a label removably held to a supporting web by a pressure sensitive adhesive and which is capable of being printed, removed from the supporting web, and pressed onto a container. The printing of such pressure sensitive labels may be performed by various printing methods. The preferred method is rotogravure printing on a continuous web using the conventional four-color process, with possibly additional color inks. The four-color printing process uses four printing cylinders which are inked, respectively, with process (transparent) yellow, process magenta, process cyan and process black ink. Line colors can be added using other colors of printing inks, for example, gold and line black inks. Rotogravure is a roll (web-fed) process in which cells are etched to form cells on the surface of the printing cylinder to form an image area. The cylinder surface is flooded with ink, the image area retaining ink within the cells, scraped clean of excess ink, i.e., using a doctor blade, then directly pressed on the paper, transferring the ink to the paper. The etching is in the form of tiny cells, typically 22,500 cells/in$^2$ (for example, 250 cells per line of inch); however, more cells per inch may be used and the cells may vary in depth to provide a variation in ink capacity. The web-fed printing process is at high speed, at least 10,000 linear feet per hour. The preferred web-printing process is rotogravure; however, photogravure and off-set printing, as well as other types of cylinder (roll) printing, are within the terms "web-fed printing" and "cylinder printing".

The use of a continuous web, instead of a flat sheet, is a relatively economical method in which the product is a roll of pressure sensitive labels including a supporting web. The roll of labels is adapted to be used in an automatic label-applying machine which applies the labels to a die-cut carton or other container. In the process of the present invention, it is critical that the print from each cylinder be exactly aligned (registered) on the label to obtain an accurate and life-like image. Any misregistration may result in an image whose color is inaccurate or which is fuzzy in detail.

Labels with pictures depicting a model for cosmetic products, especially pictures showing a head of hair for hair color kits, have not been used because of the difficulty of obtaining a high-quality and color accurate image when printing labels carried on a web at high speed (more than 10,000 linear feet per hour). If there is any misregistration, even by a hair's width, the shade of the model's hair may be inaccurate or the picture of the head of hair may be blurred.

The web is processed through a printer by take-up rollers which pull the web from a supply roll. Any variation in the printing conditions, including variations in temperature, humidity, pull-roll speed and/or tension, may cause slight movement of the web away from its intended path of travel. Such slight movements of the web, minutely distorting the images, can be cumulative through the course of processing an entire web, leading to visible degradations in the printed labels. For example, if a run of 10,000 labels is to be printed and the minute misregistrations are cumulative, the image on the first label at the beginning of the run will not match the images from the middle or end of the run. If the labels are applied to cartons, and the non-matching labels end up on a store shelf side-by-side, the differences in hair tone and/or color may be noticeable to a consumer. That consumer may be confused as to the actual hair color which she seeks or may feel that the product is inferior because its packaging is non-uniform.

Because hair dye kits, in some cases, are impulse items, a potential customer who feels even subliminally uneasy because of a sub-standard image on the packaging may purchase a competitive product.

It is known, in the prior art of rotogravure printing, to print a set of square borders on the margin of the top face of the web and then print different color squares within the borders. Each square is printed with one color of ink, which identifies the position (registration) of each color printing cylinder. The color square's position relative to its borders and the other squares is read by an operator and a reader (video-magnifier) and its data is entered into the printer's controlling computer. In addition, the required tension is printed on the web's margin using a bar code. The tension is adjusted based on a system of load cells connected to the controlling computer. The operator and computer adjust the take-up rolls at each cylinder, or cylinders, to attain the exact required position of the web. Generally such adjustment is performed by slight, millimeter range, movement of the rollers or cylinders in the direction of their axes. That web position control is critical for the printer's ability to accurately register each of the printing cylinders. However, misregistration may occur even when the multi-square system is used because it is difficult to immediately detect, and correct, misregistrations.

An alternative method for sensing color registration is disclosed in U.S. Pat. No. 4,546,700, incorporated by reference. In that method a series of black ring-like area marks are printed on the margin of a web, each of the marks being the same. Each color is printed as a block, over its own black mark. The extent that each black mark's hole is covered by a color block is measured, using a reflectometer, to determine that color's registration.

SUMMARY OF THE INVENTION

In accordance with the present invention there is provided a method and product for the printing of images, especially images on pressure sensitive labels applied to containers of hair care products in which the images (the pictures of hair) are accurate in shade and color. The images are without printing variations due to minute misregistrations in the printing process.

The present method and apparatus, which senses and corrects for color misregistration, does not involve any increase in cost or complexity in the printing process. It is based on overprinting (superposing) the different colors in an area, with each color being printed using a mark, and the marks preferably being the same size and shape. Preferably the marks are disks (solid round color marks). The marks may be very small, for example, in the range of 0.1–1.0 mm and preferably about 0.1 mm or 0.2 mm in diameter, when integrated into an image. Alternatively, the marks may be printed on the margins of the top layer of the web, and preferably are 0.1–1.0 mm in diameter and are less than 1.0 mm in diameter. Since one of the colors is black, and the other colors are printed in alignment with the black disk, if the colors are registered the composite mark appears as a single black disk. However, if one or more colors is misregistered, each misregistered color appears as a crescent which extends beyond the black disk. The color, the extent, and the direction, of misregistration is immediately visualized, using a video-magnifier, by the color, size and direction of the crescent.

Preferably the marks of the present invention are small compared to the size of the color squares of the prior art, which may be 0.5–1 cm on each side. The marks of the present invention are greatly magnified, by the video-magnifier, compared to the magnification of the color squares of the prior art. For example, a 0.2 mm diameter mark (disk-dot), on an image or on a non-image area, is magnified at least 400X and most preferably about 1000X to 2000X, which is much greater compared to the magnification of prior art color squares.

If the video-magnifier displays an image of the composite mark on a 13-inch (diagonal) monitor, the composite mark is printed on the margin of a web and is 1 mm in diameter, the resulting image size on the monitor of the video-magnifier is about 3.9 inches (10 cm) and the magnification is about 1000X. The preferred magnification range is 400–10,000X and is at least 400X.

The images are printed on labels, called herein "web-printed labels", which are printed using a web-fed printing process, e.g., cylinder (roll) printing process and the labels are formed into a roll. For example, the web (roll) may be a single layer of paper or plastic which is printed, on its front (top) face, and then cut into individual labels. Preferably, however, the web-printed labels are pressure sensitive labels carried on a paper or plastic supporting web. The term "roll" refers to both single-layer and multi-layer types of web-printed labels.

Preferably the labels are high quality glossy paper, preferably white high gloss or semi-gloss paper in the range of 50–80 pounds and most preferably white gold high gloss paper. Alternatively, the images may be printed on transparent or translucent plastic film which is cut to form pressure sensitive labels. The use of high-quality paper or plastic film permits the images to be more life-like than is obtainable if they were printed on paperboard, even if the paperboard is a high-quality paperboard. The labels may be embossed. Small copies of the labels, postage stamp size, may be used on store shelves for identification of the products.

The term "container", as used herein, refers to any shape or form of package to contain therein a product and includes both primary and secondary packaging. A primary package is a container which is in direct contact with the product, for example, a glass or plastic bottle which contains a hair dye composition. A secondary package contains one or more primary packages therein, for example, a paperboard or plastic carton which contains a primary package therein. In oxidative hair dyeing the secondary package typically contains a first container of hair dye lotion and a second container of a peroxide color developer, the contents of these containers being mixed at the time of use. The secondary packaging for such products are often referred to as kits.

The use of separately printed web-printed labels, for example, web-printed pressure sensitive labels, permits an image of a model, with the color accuracy required for hair color products, to be used on a wide variety of primary and secondary packaging, including packaging upon which it is not possible or economically feasible to directly print an accurate color image.

The labels, after printing, are shipped to the various plants for later application, by machine, to containers. For example, the containers may be cartons of SBS (Solid Bleached Sulfate) or paperboard of lower quality, and less cost, than the SBS paperboard. The cartons may be of reprocessed paper and preferably the board for the cartons may be clay coated news recycled paperboard in the caliper range of 14–22 points. The cartons may be purchased locally, which saves the cost of shipping.

Preferably the printing of the carton paperboard is by a web-printing process, which has cost advantages compared to sheet-fed printing. The carton paperboard may be printed with text, such as instructions, product ingredients, etc., and lower quality images, having a density range below 2.0. The paperboard stock may be a roll that is fed as a web to the web-printer, i.e., off-set or rotogravure. Such web-fed printing is at high speed, over 10,000 linear feet per hour. This may be fastener, and consequently more economical, than a sheet-fed printing process.

Since the products may be distinguished by the labels, and not by printing on the cartons, it is only necessary to have an inventory of different labels. The cartons, for each product line, are the same, regardless of the label which is applied. It is less costly to maintain an inventory of, for example, 40 different label types, than an inventory of 40 different carton types. Most importantly in terms of cost, the cartons are "generic" (used for many hair dye colors). Such generic cartons are preferably printed from rolls of paperboard in "long runs" (at least 300,000 and preferably over 1,000,000). The long printing runs, using web-printing, may result in a carton price which is one-third, or less, than the cost of cartons with a hair color image printed using sheet-fed printing and short runs.

The use of pressure sensitive labels permits a number of enhancements which are not possible with simply printing on a carton. In one embodiment a layer of high-gloss aluminum foil is interposed between the label layer and the adhesive layer. The models' face area, on an image, is die-cut and may be lifted off, e.g., it is separately peelably removable. The customer may then use the aluminum foil, underneath the removed face area, as a mirror. She may see her own face framed by the printed hair in order to envision how she would look with the color of hair illustrated on the label.

As another example, labels may be printed which are miniatures (reduced in size) and which duplicate the regular size labels which are adhered to the product boxes. These miniature labels may be used on the front of shelves to identify the products displayed on the shelves. The container may be a transparent plastic box and the label may be printed on both its front and back sides. A picture, or text, on the back of the label may be viewed by looking through the plastic container. Also a label may be applied over a portion of another label which is adhered to a container.

BRIEF DESCRIPTION OF THE DRAWINGS

In the enclosed drawings.

DETAILED DESCRIPTION OF THE INVENTION

It is difficult to obtain good consistent color quality of printed images because of problems of color control, mainly related to process limitations, process variability and communication, i.e., between the printing company and the advertising agency. The color inks used in the four-color printing process, called "process inks", are the pigmented subtractive primary ink colors of cyan (process blue), magenta (process red) and yellow, along with process black. Each color process ink is a transparent printing ink designed to absorb about one-third of the visible spectrum and transmit two-thirds. The paper reflects the light and the inks absorb portions of it. Generally a halftone screen breaks up colored pictures into tiny dots. A 150-line screen has 150× 150 dots (22,500) in a square inch. For example, red is obtained by printing both magenta dots (absorbs green) and yellow dots (absorbs blue) leaving only red reflected from the paper.

Since the color is obtained by reflection from the paper, its surface smoothness and other characteristics are important in the quality of the printed image.

Often hair dye packaging uses a picture of a human model. However, human flesh is a "memory color" (psychological reference color) which is a color seen regularly that people tend to remember best. It is difficult to obtain a print reproduction which is close as possible to flesh color.

In general, the better the quality of paper, in terms of brightness and smoothness, the greater is the obtainable density range. "Density" is the ability of a material to absorb light and is inversely proportional to the amount of light reflected from a surface. An original transparency may have a density range (from highlight to shadow) of 2.70 (a measurement made by a densitometer). A four-color reproduction (high quality image) on high quality glossy paper and good ink has at least a density range of 2.00. However, on uncoated paper, such as some types of paperboard, the maximum density range may be only 1.70 or less. A lower density range results in tone compression so that the picture appears flattened (low quality printed subject matter). As the paper grade becomes less, the color saturation will also decrease.

The use of a paper label or plastic film label carried on a paper web and printed in color while on the web permits more flexibility in the selection of paper grade or plastic film than printing on paperboard.

The paper quality (paper grade) affects the number of lines of the screen per inch (the number of dots per inch) which may be used; the size of the dots in the highlight, middletones and shadow; the tone scale; the contrast, gray balance and the saturation. A smooth hard surface paper will produce whiter highlights (reflect more light to the observer's eyes). The shadow areas will be glossy, as the ink will tend to remain on the surface, which will increase the density of shadows and increase the color saturation. Lower quality papers with a rougher texture and more absorbent surface will generally produce lower quality color reproductions.

In printing labels on a web the material of the web is under tension. "Stretch", which is the distortion of the paper size, may occur in the cross-grain direction (direction of fibers corresponding to the direction the web paper was made). Stretching may cause color registration problems. The cross-grain direction expands and contracts as the paper responds to moisture, temperature and pressure. Stretching may also cause register problems.

In addition, changes in moisture content may result in "fiber puff", which is a swelling of certain fibers in the paper. This causes changes in the paper surface and degrades the image. The use of cardboard as the printing surface may permit more instances of fiber puff than printing labels from high-grade paper or plastic film.

These problems are mainly solved, in the present invention, by using high-grade glossy paper or plastic film for the labels and immediately detecting misregistration and correcting such misregistration by controlling the position of the web during printing.

The basic tension on the web is measured by load cells on the first and last cylinders and is set by a bar code which has been printed on the web margin. If the registration of any one, or more, of the colors being printed is imperfect, for example, due to sidewise movement of the web, the printed image may be blurred and/or colors may be out of registration.

As shown in FIGS. 5–8, color registration is obtained by printing test marks which exactly overlap and align (superposed), if there is correct registration. Preferably the shape of the mark is a disk, although other shapes, such as squares, may be used.

Figure 6:
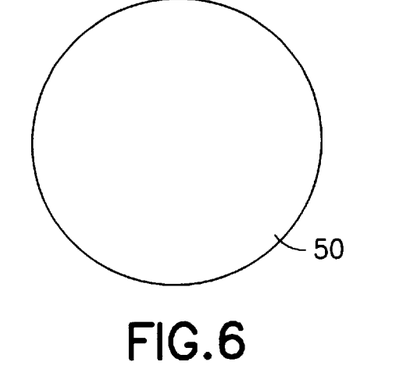
FIG. 6 is a greatly enlarged top plan view of a plurality of color disks used for registration and printed on the margin of a supporting web, the disks showing that the colors are correctly registered.

FIG. 6 illustrates a correct color registration. Since one, or more, of the color inks is black the disk 50 will be black. If a four color process is used the disk 50 consists of a cyan disk, magenta disk, yellow disk and black disk printed one on top of the other—in any order. If more color inks are used they will also be printed in disk-shaped marks on top of the disk of FIG. 6.

Figure 7:
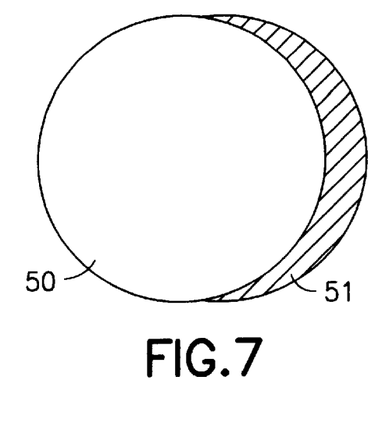
FIG. 7 is an enlarged top plan view of color disks as in FIG. 5, but with one of the disks being slightly misregistered.
Figure 8:
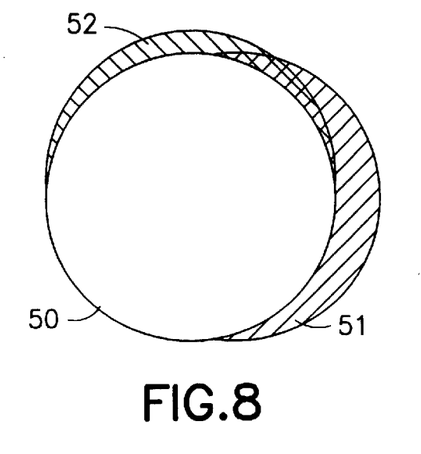
FIG. 8 is an enlarged top plan view of color disks, as in FIG. 6, but showing that two colors are misregistered.

As shown in FIG. 7, one color, for example, cyan, is incorrectly registered and appears as a crescent 51 which extends beyond disk 50. Its color, and the direction and extent of misregistration, is immediately apparent from the color, size and direction of crescent 51. In FIG. 8 two colors are misregistered and appear as two crescents 51 and 52. In this example crescent 51 indicates a longitudinal direction misregistration and crescent 52 indicates a latitudinal direction misregistration.

Figure 9:
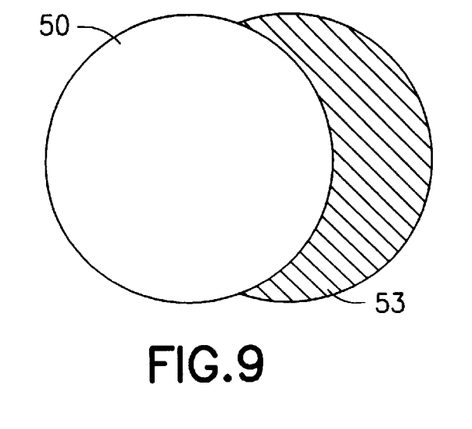
FIG. 9 is a top plan view of color disks, as in FIG. 6, but showing that one color is grossly misregistered.

In FIG. 9 the crescent 53 is of the same color (cyan) as crescent 51 and is out of registration. It is in the same direction (longitudinal) as in FIG. 7 but its misregistration is larger than in FIG. 6.

The superposed marks are preferably very small, less than 1 mm in diameter (largest width dimension) and in the range of 0.1 mm to 1.0 mm. Preferably the superposed marks are greatly enlarged using a conventional video-magnifier, which permits a faster response to misregistration. That magnification is at least 400 (400X) and most preferably is in the range 10000X–2000X.

In one embodiment (not illustrated) the superposed marks of the present invention are within an image printed on each label. A careful review of an image may show a satisfactory position for the superposed marks where a black dot surrounded by a white area would be viewed as a natural part of the image. That black dot can be used as the superposed color marks 50 (FIGS. 6–9).

Figure 10:
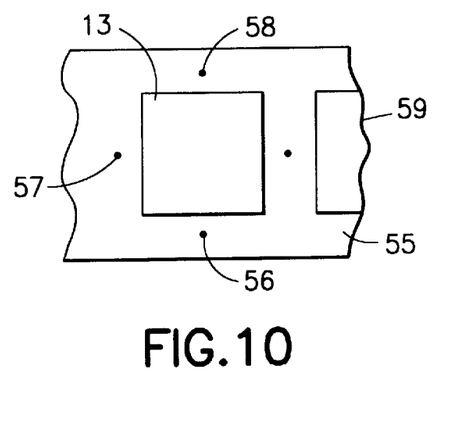
FIG. 10 is a top plan view showing portions of two labels and showing three sets of superposed registration marks.

Alternatively, the superposed color marks may be printed on the top layer of a web outside of the image area. For example, in the case of pressure sensitive labels which are cut-out from a top layer of a web, the superposed marks are preferably printed on the top layer outside of the borders of the labels. Preferably at least three sets of superposed color marks are associated with each label. As shown in FIG. 10, the label 13 is formed on the top layer 55 of a web 59. The web comprises a supporting web (supporting layer) and the top layer 55. Three sets of superposed color marks 56–58 are associated with the label 13. Each superposed mark 56–58 consists of a mark for each of the colors being printed. The superposed marks 56–58 are outside the boundary of the label 13, preferably in the margins below the label, above the label and between the label and the next label.

The grade of the paper label is preferably white high gloss paper and most preferably gold high gloss paper in the range of 50 to 80 pounds. The plastic film is preferably transparent or translucent plastic film 2 to 4 mils in thickness and may be a suitable polyester, polyethylene or other polymer. The grade of the cardboard for the carton may be SBS or clay coated news back recycled paperboard (CNN) and is in the range of 14–22 points.

Figure 1:
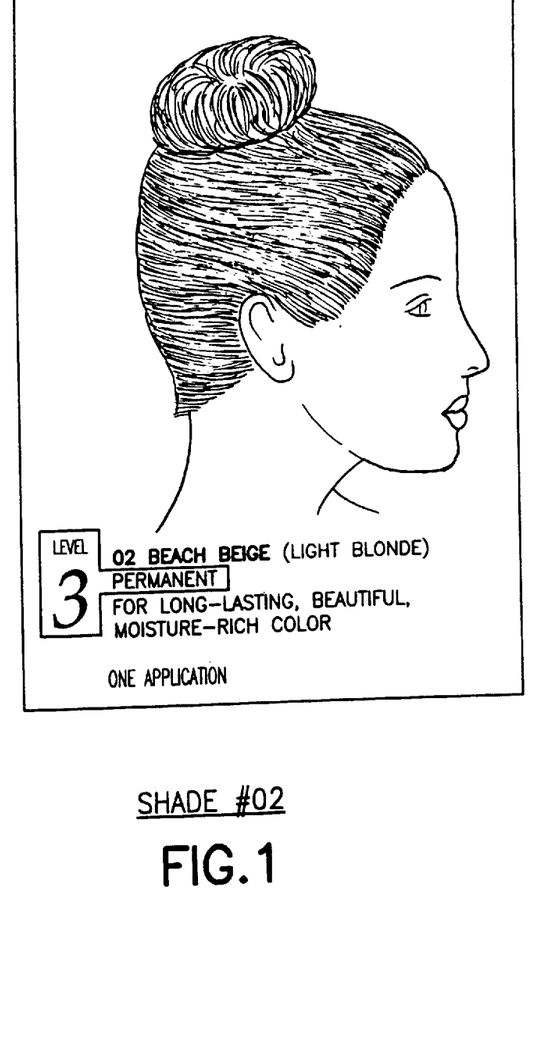
FIGS. 1–3 are images for a hair dye product which show models having three different hair colors. The colors are related (color family) and consist of Shade No. 02 (FIG. 1), No. 06 (FIG. 2), and No. 10 (FIG. 3)
Figure 2:
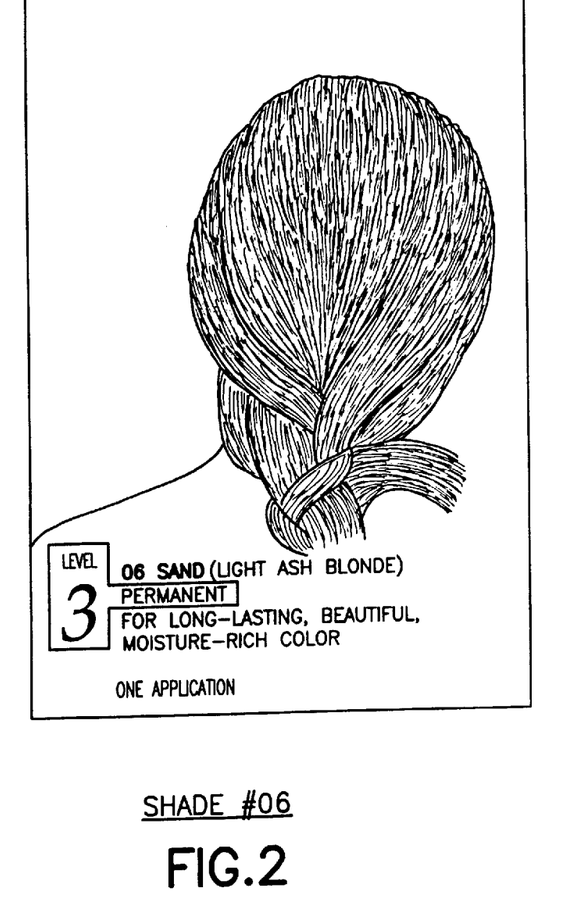
Figure 3:
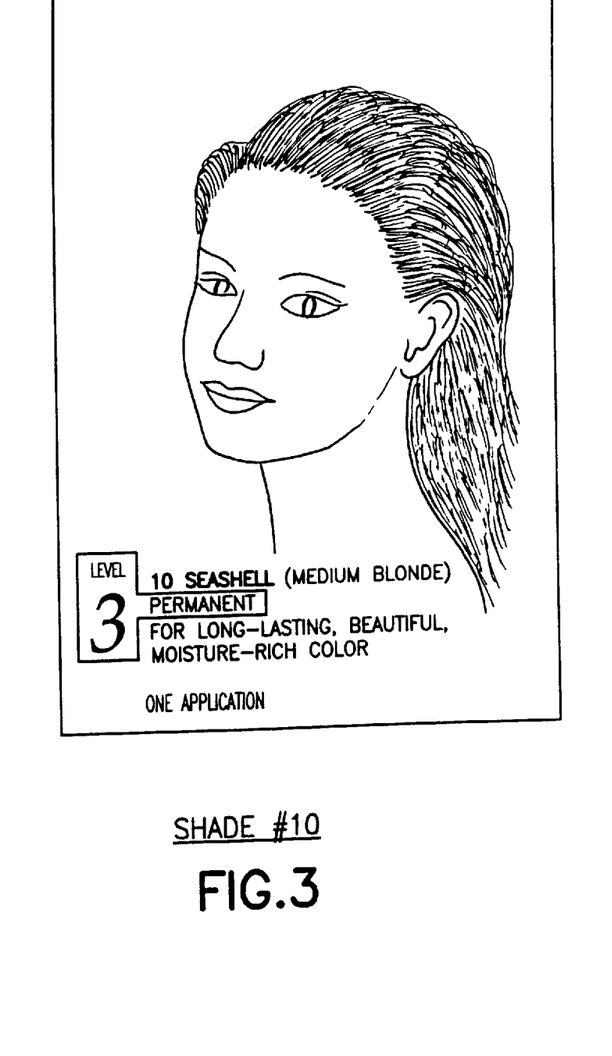

FIGS. 1, 2 and 3 indicate the subtle variations in shade between three hair dye shades in a color family. A "color family" is a plurality of hair dye colors having common tones and hues, e.g., black, brown, red and blonde. These three examples are the closest hair dyes, in shade tonality, in a color family.

It is important that the color images of hair be exactly the same on all the labels of the same product. Drift of the images, during a run, resulting in visible distortion of the images, is not acceptable. However, during a run a number of labels may be rejected, under a quality control program, for various reasons. For example, the response time of the control system may have been too slow, resulting in too much or too little ink.

The hair image is not a simple block of color, as the blocks of color displayed on a paint can or cosmetic face powder container. The hair image is complex and involves shade tonalities, which are shading and shadows as well as internal differences in tone, hue and brightness. If exactly the same hair image is not maintained, the customer may not be able to distinguish related products in the same color family, i.e., she would not be able to distinguish the product of FIG. 1 (shade number 02) from the product of FIG. 2 (shade number 06). The differentiation between the images on the different products must also be kept constant, i.e., the apparent difference between the images on the products of FIGS. 1, 2 and 3 must be the same regardless of where on the web, or run, the labels are selected.

Figure 4:
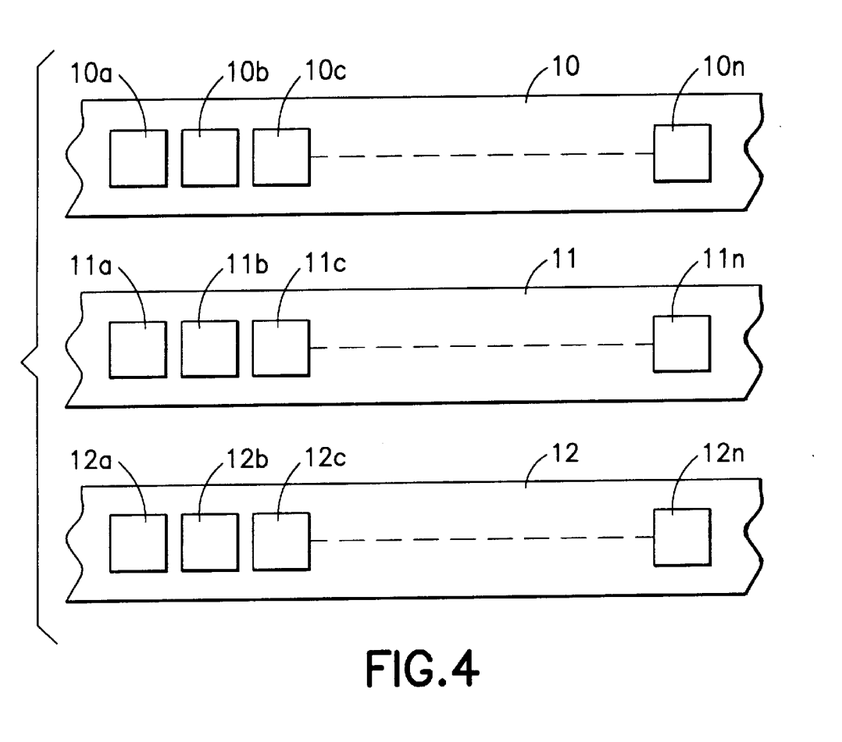
FIG. 4 is a top plan view of three strips of labels on their webs.
Figure 5:
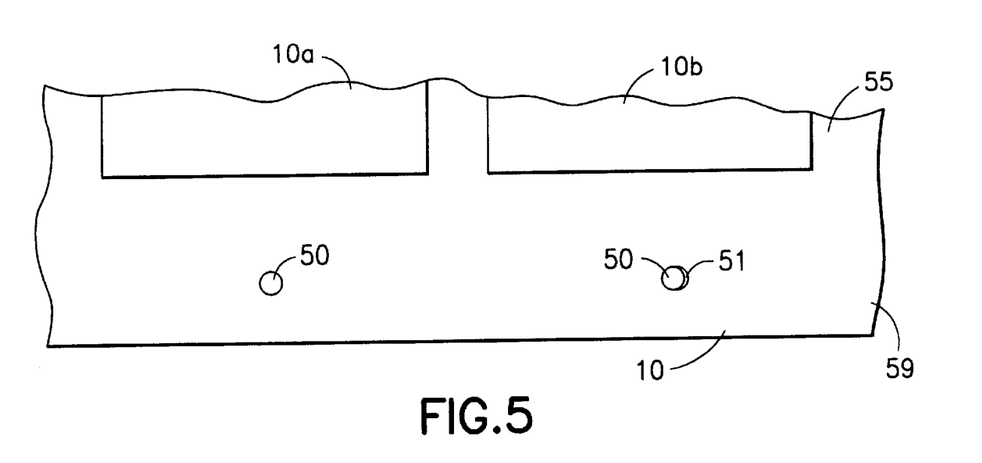
FIG. 5 is an enlarged top plan view showing the bottom portion of two pressure sensitive labels and two marks used to determine color registration.

As shown in FIG. 4, the webs 10–12 each carry a series of pressure sensitive labels 10a, 10b, 10c . . . 10n; 11a, 11b, 11c . . . 11n; 12, 12b, 12c . . . 12n, where n is often less than 100,000. For example, the labels 10a–10n have the image of FIG. 1; the labels 11a–11n have the image of FIG. 2; and the labels 12a–12n have the image of FIG. 3. Each image on the web is exactly the same, i.e., 10a is exactly the same hair color image, in tone, hue and brightness, as the image on label 10n. Consequently, there will be a uniform difference in appearance so that the differences between the images as between the labels 10a, 11a and 12a will be exactly the same differences as between labels 10n, 11n and 12n.

The hair dye shades of the labels on the webs 10–12 are related in color; they are members of the same color family. Generally a color family, such as blonde, has 5 or 6 colors; although a color family may have as many as 10 colors.

The labels are printed using a cylinder (roll) web printing process, preferably rotogravure. The printing is at a normal web printing speed and is at least 10,000 linear feet per hour.

A considerable money saving is obtained by applying the labels to generic cartons, or other containers, which are produced and printed with text, etc. (without the hair color image), in long runs (at least 300,000 and preferably over 1,000,000) using a web-printing process. Such containers produced in long runs are called, herein, generic containers.

Modifications may be made in the present invention within the scope of the claims. For example, the superposed marks may be ring-shaped, rectangular or triangular.

What is claimed is:

1. A method of packaging comprising the following steps:
   (a) forming a multi-layer web comprising a top layer having a series of pressure sensitive labels and a supporting layer; the labels being of white high-quality paper or of plastic film;
   (b) printing color ink marks for each color being printed, the marks being printed on the top layer and the marks being printed at the same spot so they are coincident, superposed and aligned when the colors are registered, and a color mark is outside the coincident shapes of the other marks if its color is misregistered;
   (c) printing the labels using a web printing process, each label having a color picture of accurate hair shade tonalities;
   (d) displaying a magnified image of the printed marks using a video-magnifier and adjusting the registration of the colors to correct misregistered colors based on the magnified image;
   (e) producing a long run of over 300,000 generic containers;
   (f) removing the labels from the web and applying the labels to the generic containers; and
   (g) filling the containers with a product.

2. A method as in claim 1 wherein the hair shade tonalities are on a color picture of at least a portion of a head of hair.

3. A method as in claim 1 wherein the container are web-printed paperboard cartons of solid bleached sulfate (SBS) paperboard.

4. A method as in claim 1 wherein the containers are web-printed cartons of recycled paperboard.

5. A method as in claim 1 wherein the containers are bottles.

6. A method as in claim 1 wherein the containers are plastic.

7. A method as in claim 1 wherein the product is a hair dye, the dye is in a bottle, and the bottle is within the container.

8. A method as in claim 1 wherein the marks are a geometric shape having the same size and shape, and each mark having an outer boundary, the outer boundaries of the marks coinciding when the colors are in registration.

9. A method as in claim 1 wherein the marks are disks.

10. A method as in claim 9 wherein a misregistered color disk extends as a crescent beyond the correctly registered disks.

11. A method as in claim 1 wherein the marks are less than 1 mm in diameter.

12. A method as in claim 11 and displaying the marks during the printing of the images on a video-magnifier with a magnification of at least 400X.

13. A method as in claim 1 wherein the marks are printed in the picture.

14. A method as in claim 1 wherein the marks are printed on the top layer outside of the labels.

15. A method as in claim 1 wherein three sets of marks are printed outside of each label.

16. A method as in claim 1 and printing the labels using rotogravure printing.

17. A package for a cosmetic product, the package having a very high quality image illustrating the effect produced by the cosmetic product and a density range of at least 2.0, the package comprising:
   (a) a carton blank having a nonhigh quality image and
   (b) a high-quality white paper or plastic film web-printed label adhesively affixed to the carton blank and having printed thereon said high quality image;

the carton blank being selected from a plurality of carton blanks obtained from a supply of paperboard stock, the nonhigh quality images being printed on the blanks, and the label being selected from a plurality of labels obtained from a four-color high speed web printer that forms very high quality images on a web, in which printer:

(i) a color ink mark relative to a plurality of other color ink marks is printed in superimposed position on the other marks and then observed to determine its registration; and (ii) the registration of the colors is adjusted to correct for misregistration of the mark relative to the other mark, whereby the accuracy of the high quality image is maintained, the high quality image for each label present on said web being essentially exactly reproducible as compared to a matchprint and as compared to labels from another web for the same cosmetic product.

18. The package of claim 17 wherein the marks are the same size and the same shape.

19. The package of claim 17 in which the carton blank is from a long run of at least 300,000 generic container carton blanks.

20. The package as in claim 17 wherein the carton blanks are printed in a web printing process at over 10,000 linear feet per hour.

21. The package of claim 17 in which the pressure sensitive labels are present on a supporting web and are peelably removable therefrom.

22. The package of claim 17 wherein the marks are printed on the high quality image.

23. A product-by-process of a hair dye product packaged in a container, the process comprising the following steps:

(a) forming a first multi-layer web and a second multi-layer web with a series of pressure sensitive labels removably adhered to the top layer of each web; the labels being of high-quality white paper or of plastic film;

(b) printing a color ink mark of each color being printed on the top layer of each web, the marks being of the same size and shape, the marks being printed on top of each other to be superposed and coincide in size, shape and position if the colors are registered and not to coincide in position if a color is misregistered; and reading the position of the marks relative to each other to determine registration of the colors;

(c) adjusting the registration of the colors if any color is misregistered;

(d) printing the labels on a web cylinder gravure printing process, each label having a color picture of at least a portion of a head of hair having accurate hair shade tonalities, with the hair color being the color sought to be produced by the hair dye product;

(e) producing a long run of over 300,000 generic containers;

(f) removing the labels from the webs and applying the labels to the generic containers; and (g) filling the containers with hair dye products; the product produced by the process of steps (a)–(g) being a series of the generic containers some of which have labels from the first web adhered thereto and others of which have labels from the second web adhered thereto, the hair color being a member of a color family of closely related shades, the labels of the first web displaying one hair color from the color family and the labels from the second web displaying its closest related hair color from the same color family; wherein there is a uniform difference in appearance, to an observer of the image of hair between any two labels randomly selected from the first and second webs.

24. A product-by-process as in claim 23 wherein the generic containers are web-printed paperboard cartons of solid bleached sulphate (SBS) paperboard.

25. A product-by-process as in claim 23 wherein the generic containers are web-printed cartons of recycled paperboard.

26. A product-by-process as in claim 23 wherein the marks are disks.

27. A product-by-process as in claim 23 wherein the containers are bottles.

28. A product-by-process as in claim 23 wherein the hair product is a dye, the dye is in a bottle and the bottle is within the container.

29. A product-by-process as in claim 23 wherein the containers are plastic.

30. A product-by-process as in claim 23 wherein the labels are applied to labels which are adhered to containers.

31. A product-by-process as in claim 23 wherein the marks are printed on the picture.

32. A plurality of webs each having a series of color web-printed labels, the labels being adapted to be applied to containers of products, each label having an image of at least a portion of a head of hair, each web having printed thereon a plurality of registration marks of a selected shape, each mark having an outer boundary with one mark for each color which is printed to form the image, the marks being the same shape and being printed and superposed in the same location; so that if the colors are in registration the boundaries of the marks coincide, but if a color is misregistered the boundary of its mark extends beyond the boundaries of the marks of the colors which are in registration.

33. A plurality of webs as in claim 32 wherein the containers are generic long run web-printed containers from a production run of over 300,000 containers.

34. A plurality of webs as in claim 32 wherein the labels are pressure sensitive labels and the webs are multi-layer webs.

35. A plurality of webs as in claim 32 wherein the product is a hair color product and the image displays a head of hair of the color and shade tonality sought to be produced by the hair color product.

36. A plurality of webs as in claim 32 wherein the marks are disks.

37. A plurality of webs as in claim 32 wherein the product is a bottle of hair dye and the bottle is within the container.

38. A plurality of webs as in claim 32 wherein the labels are adapted to be applied to other labels which have been applied to containers.

39. The plurality of webs as in claim 32 wherein the labels have a printed front face and a back face and the labels are cut from the web and adhesive applied to the back face thereof.

* * * * *

UNITED STATES PATENT AND TRADEMARK OFFICE
CERTIFICATE OF CORRECTION

PATENT NO. : 5,819,655
DATED : October 13, 1998
INVENTOR(S) : Nicola Delli Venneri, et al.

It is certified that error appears in the above-identified patent and that said Letters Patent is hereby corrected as shown below:

On the title page, Item [54], and Column 1, "CYCLINDER" should read --CYLINDER--.

Signed and Sealed this

Twenty-seventh Day of July, 1999

Attest:

Q. TODD DICKINSON

Attesting Officer

Acting Commissioner of Patents and Trademarks